(12) United States Patent
Tolman et al.

(10) Patent No.: US 11,402,351 B1
(45) Date of Patent: Aug. 2, 2022

(54) APPARATUS, SYSTEMS, AND METHODS FOR DISCRIMINATE HIGH-SPEED INSPECTION OF TUBULARS

(71) Applicant: SCAN SYSTEMS, CORP, The Woodlands, TX (US)

(72) Inventors: John Tolman, Humble, TX (US); Danny Uselton, Spring, TX (US); John Zeigler, The Woodlands, TX (US)

(73) Assignee: SCAN SYSTEMS CORP., The Woodlands, TX (US)

( * ) Notice: Subject to any disclaimer, the term of this patent is extended or adjusted under 35 U.S.C. 154(b) by 104 days.

(21) Appl. No.: 16/987,232

(22) Filed: Aug. 6, 2020

Related U.S. Application Data

(60) Provisional application No. 62/889,382, filed on Aug. 20, 2019.

(51) Int. Cl.
*G01N 27/90* (2021.01)
*G01N 27/9093* (2021.01)
*G01N 27/904* (2021.01)

(52) U.S. Cl.
CPC ....... *G01N 27/9006* (2013.01); *G01N 27/904* (2013.01); *G01N 27/9093* (2013.01)

(58) Field of Classification Search
CPC ............. G01N 27/9006; G01N 27/904; G01N 27/9093
USPC ........................................ 324/222, 228, 240
See application file for complete search history.

(56) References Cited

U.S. PATENT DOCUMENTS

| | | | |
|---|---|---|---|
| 2,563,254 A | 8/1951 | Lewis | |
| 2,886,772 A * | 5/1959 | Gresham | G01N 27/9093 324/241 |
| 3,437,917 A | 4/1969 | Gunkel et al. | |
| 3,539,915 A | 11/1970 | Walters et al. | |
| 3,612,987 A * | 10/1971 | Placke | G01N 27/9013 324/242 |
| 3,710,236 A | 1/1973 | Halsey et al. | |

(Continued)

FOREIGN PATENT DOCUMENTS

| | | |
|---|---|---|
| DE | 3729743 A1 | 3/1989 |
| JP | S61277051 A | 12/1986 |

(Continued)

OTHER PUBLICATIONS

AN9003—A User's Guide to Intrinsic Safety, retrieved from the Internet Jul. 12, 2017.

(Continued)

*Primary Examiner* — Lee E Rodak
*Assistant Examiner* — Rahul Maini
(74) *Attorney, Agent, or Firm* — Jeffrey L. Wendt; The Wendt Firm, P.C.

(57) ABSTRACT

High-speed tubular inspection systems include a frame at least one magnetic flux generator contained in a coil annulus and a detector assembly each having inlet and outlet openings for passing a tubular member there through. The detector assembly has one or more magnetic detectors and one or more eddy current detectors configured to be spaced a first distance from the tubular member during an inspection. The detectors are each contained in one or more EMI detector shoes. A conveyor supports the frame and a drive mechanism configured to drive the tubular member through the coil annulus (or drive the coil annulus past the tubular member) at high-speeds.

18 Claims, 6 Drawing Sheets

(56) References Cited

U.S. PATENT DOCUMENTS

| | | | |
|---|---|---|---|
| 3,958,049 A | 5/1976 | Payne | |
| 4,058,762 A | 11/1977 | Holt et al. | |
| 4,092,881 A * | 6/1978 | Jurgens | E21B 19/16 |
| | | | 29/240 |
| 4,217,548 A | 8/1980 | Furukawa et al. | |
| 4,218,651 A | 8/1980 | Ivy | |
| 4,378,072 A * | 3/1983 | Appleman | B66C 19/005 |
| | | | 212/344 |
| 4,465,829 A | 8/1984 | Graves | |
| 4,503,393 A | 3/1985 | Moyer et al. | |
| 4,510,447 A | 4/1985 | Moyer | |
| 4,534,405 A * | 8/1985 | Hulek | G01N 27/9006 |
| | | | 164/150.1 |
| 4,543,528 A | 9/1985 | Baraona | |
| 4,585,826 A | 4/1986 | Graves | |
| 4,602,212 A | 7/1986 | Hiroshima et al. | |
| 4,629,991 A | 12/1986 | Wheeler | |
| 4,675,604 A | 6/1987 | Moyer | |
| 4,739,273 A | 4/1988 | Peterson et al. | |
| 4,912,410 A | 3/1990 | Morley | |
| 4,916,394 A | 4/1990 | Thompson | |
| 5,007,291 A | 4/1991 | Walters et al. | |
| 5,030,911 A | 7/1991 | Lam | |
| 5,142,230 A | 8/1992 | Nottingham | |
| 5,157,977 A | 10/1992 | Grubbs | |
| 5,446,382 A | 8/1995 | Flora | |
| 5,671,155 A | 9/1997 | Edens et al. | |
| 5,914,596 A | 6/1999 | Weinbaum | |
| 5,943,632 A | 8/1999 | Edens et al. | |
| 6,316,937 B1 | 11/2001 | Edens | |
| 6,580,268 B2 | 6/2003 | Wolodko | |
| 6,745,136 B2 | 6/2004 | Lam et al. | |
| 6,912,097 B2 | 6/2005 | Woods | |
| 6,924,640 B2 | 8/2005 | Fickert et al. | |
| 7,038,445 B2 | 5/2006 | Walters et al. | |
| 7,107,154 B2 | 9/2006 | Ward | |
| 7,337,673 B2 | 3/2008 | Kennedy et al. | |
| 7,346,455 B2 | 3/2008 | Ward et al. | |
| 7,397,238 B2 | 7/2008 | Walters et al. | |
| 7,560,920 B1 | 7/2009 | Ouyang et al. | |
| 7,622,917 B2 | 11/2009 | Walters et al. | |
| 7,640,811 B2 | 1/2010 | Kennedy et al. | |
| 7,795,864 B2 | 9/2010 | Barolak et al. | |
| 8,020,460 B1 | 9/2011 | Hoyt | |
| 8,264,221 B2 * | 9/2012 | Faucher | G01N 27/9026 |
| | | | 324/227 |
| 9,097,081 B2 | 8/2015 | Biddick | |
| 9,879,131 B2 | 1/2018 | Bedard et al. | |
| 10,082,485 B2 | 9/2018 | Uhlig et al. | |
| 10,767,470 B2 | 9/2020 | Fouda et al. | |
| 11,307,173 B1 | 4/2022 | Uselton et al. | |
| 2006/0164091 A1* | 7/2006 | Nestleroth | G01N 27/902 |
| | | | 324/326 |
| 2007/0024278 A1* | 2/2007 | Walters | G01N 27/902 |
| | | | 324/242 |
| 2011/0167914 A1* | 7/2011 | Sutherland | G01N 27/902 |
| | | | 73/643 |
| 2018/0196005 A1 | 7/2018 | Fanini et al. | |
| 2020/0040674 A1* | 2/2020 | McKenzie | E21B 19/14 |

FOREIGN PATENT DOCUMENTS

| | | |
|---|---|---|
| JP | S63221239 A | 9/1988 |
| JP | S6447944 A | 2/1989 |
| JP | H01110251 | 4/1989 |
| JP | H01232254 A | 9/1989 |
| JP | H02253152 A | 10/1990 |
| JP | H06148139 A | 5/1994 |
| JP | 2000081419 A | 3/2000 |
| JP | 2014044087 A | 3/2014 |
| RU | 36485 U1 | 3/2004 |

OTHER PUBLICATIONS

Buckley, J.M., "An introduction to Eddy Current Testing theory and technology", pp. 1-7, Dec. 29, 1998, place of publication unknown, retrieved from the Internet Jun. 13, 2019.

Walters et al., "Using Magnetic Flux Density to Identify Anomalies in Pipe Wall Thickness", pp. 1-21, Dec. 23, 2005, place of publication unknown, retrieved from the Internet Nov. 19, 2012.

Staff report, Hydraulics & Pneumatics, "Fundamentals of quick-acting couplings", pp. 1-12, Jan. 1, 2012, place of publication unknown, retrieved from the Internet May 14, 2019.

HARCO Metal Products Inc., "Telescoping Tube", 1 page, 2013, place of publication unknown, retrieved from the Internet May 13, 2019.

Stanley, R. K., "Electromagnetic Inspection of Carbon Steel Tubes", pp. 1-10, 1998, ASME NDE Group Conference, San Antonio, TX, published by NDE Information Consultants, Houston, Texas.

Jain, N., "The Rebirth of Eddy Current Nondestructive Testing", Quality Magazine, pp. 1-5, Aug. 11, 2014.

Niese et al., "Wall Thickness Measurement Sensor for Pipeline Inspection using EMAT Technology in Combination with Pulsed Eddy Current and MFL", ECNDT 2006—Tu.3.1.5, pp. 1-10, published by ECNDT (2006).

USPTO, Notice of Allowance dated May 6, 2022, U.S. Appl. No. 16/987,221, filed Aug. 6, 2020.

Yang, et al., "Inspection and Identification of Inner-Outer Defects on Oil-gas Pipeline", 17th World of. on Nondestructive Testing, Oct. 25-28, 2008, Shanghai, China, Chinese Society for Nondestructive Testing, Shanghai, China, downloaded from the Internet May 4, 2022, url: https://www.ndt.net/search/docs.php3?id=6673&file=artide/wcndt2008/papers/487.pdf.

USPTO, Notice of Allowance dated Feb. 18, 2020, U.S. Appl. No. 16/987,195, filed Aug. 6, 2020, published as U.S. Pat. No. 11,307,173 B1, Apr. 19, 2022.

USPTO, Non-Final Office Action dated Feb. 1, 2022, U.S. Appl. No. 16/987,221, filed Aug. 6, 2020.

\* cited by examiner

APPARATUS, SYSTEMS, AND METHODS FOR DISCRIMINATE HIGH-SPEED INSPECTION OF TUBULARS

CROSS-REFERENCE TO RELATED APPLICATIONS

This application is entitled to and claims the benefit of earlier filed provisional application No. 62/889,382, filed Aug. 20, 2019, under 35 U.S.C. § 119(e), which earlier filed provisional application is incorporated by reference herein in its entirety.

BACKGROUND INFORMATION

Technical Field

The present disclosure relates to apparatus, systems, and methods useful for high-speed magnetic inspection of tubular goods (hollow or solid), particularly automated high-speed inspection of tubular goods with discrimination between location of flaws occurring on or near the outside and inside diameters of tubulars (sometimes referred to in the oil & gas industry as "oil country tubular goods", and herein sometimes as simply "OCTG").

Background Art

Quality control of tubulars intended for use in various environments, for example, downhole applications, requires detection of flaws in the tubulars prior to their use to ensure that the tubulars are within quality limits. Such limits may include restrictions on the number of flaws allowed to be present, or the size of such flaws, or a combination of such restrictions. It is desirable to inspect the tubulars as part of the production process before they leave the tubular manufacturing facility, or at least prior to shipping to an end user. In this way, the steel mill or other tubular manufacturing facility can identify questionable tubulars, re-test them as necessary, and prevent defective tubulars from being shipped. Unless as specified otherwise, as used herein "tubular" and "tubulars" refers to hollow or solid sections, hollow sections sometimes referred to in the OCTG art as single random, double random, or cut to length sections. Background patents in the art may include U.S. Pat. Nos. 3,437,917; 7,397,238 and 7,622,917, which describe electromagnetic inspection (EMI) of metal pipe or solid metal tubular members by magnetizing the member to create a magnetic field which extends circumferentially and is characterized by lines of magnetic flux which extend either axially of the tubular member or generally perpendicular to its axis, dependent on the manner by which magnetism is induced. U.S. Pat. No. 4,916,394, describes detecting or sensor coils placed closely adjacent the exterior surface of the tubular member. U.S. Pat. No. 4,602,212 describes sensors holders (housing therein magnetic field detectors) that are mounted radially movably through a link mechanism providing a leaf spring to push the sensor holders radially inwardly. U.S. Pat. No. 8,020,460 describes a similar arrangement, whereby a flexible sensor mount may comprise an elastic material, such as a polyurethane elastomer, thereby permitting relative motion of a relatively rigid sensor housing that houses one or more sensors. U.S. Pat. No. 7,640,811 describes a mechanical probe extension coupler that presses an acoustic inspection probe (described in U.S. Pat. No. 7,337,673) against the structure to adjust for surface contour changes.

Tubular manufacturing facilities perform such inspections in real time, preferably the inspection equipment operating at the speed of the production line, which is generally 200 linear feet per minute. Thus, this equipment must accurately detect flaws in tubular moving at a relatively high speed. Known detection equipment generally utilizes either ultrasound or magnetic detection to find flaws in the tubular being tested. However, simply finding a flaw is insufficient. It is also important to know whether the characteristic of the flaw, such as its diameter or its transverse extent into the wall of the tubular, exceed allowable standards. Because these standards may be different depending on whether the flaw is on the interior circumference or the exterior circumference of the tubular, it is also important to know which surface the flaw is on.

Ultrasonic test equipment has the ability to make these determinations, although it is relatively expensive to operate, and thus economically inefficient for the tubular manufacturer. Magnetic detectors are less expensive but have previously been limited by the inability to discriminate whether a flaw was on the inner or outer circumference of the tubular. To use magnetic detectors, it has been necessary to use the magnetic detector to determine the location of a flaw, then to pull the tubular out of the production line and use additional test equipment, such as a manually operated ultrasound detector, to identify whether the flaw is on the inner or outer circumference of the tubular. Such testing has the advantage of minimizing the need to use ultrasound equipment but is less efficient than if this determination could be made in the production line.

In the downhole environment it is known to employ magnetic detectors to discriminate whether a flaw is on the inner or outer circumference of the tubular. U.S. Pat. No. 6,924,640 discloses a downhole magnetic inspection tool conveyed downhole by the drawworks and a logging cable. The tool employs shallow reading sensors, such as eddy current sensors or reluctance sensors to detect flaws on the inner surface of a tubular (casing). If a Hall effect sensor detects a loss of metal and a response from a shallow response sensor is also measured, then it is concluded that the flaw is on the inner surface of the tubular; if there is no response from the shallow response sensor, then it is concluded that the flaw is on the outer surface of the tubular.

When drilling or logging cable is spooled on and off a drawworks drum during operations such as drilling a well, running casing, coring, inspection, and the like, the drilling cable suffers wear and may stretch; therefore, drilling contractors must cut out the worn section and replace it with new section of cable. The most worn area is the end of drilling cable where it is constantly spooled over the drawworks drum. A section of cable, typically around 100 ft, is cut then the cable is re-attached to the drawworks drum and the amount cut off is spooled back on the drum. This operation is called "slip and cut." Given this, the rate of travel or speed of the inspection tool disclosed in the '640 patent will not be consistent due to the wear and stretching of the cable that propels it. This inconsistency may be tolerable for downhole applications, where flaw measurements may be made with the tool moving at varying speeds or even stationary as taught by the '640 patent, but this is unacceptable to high-speed continuous tubular manufacturing, where speed of inspection is of utmost importance.

Moreover, downhole inspections do not have to contend with the "end area" problem, since there is no effective end area of downhole tubulars. As noted in assignee's U.S. Pat. No. 11,307,173, issued Apr. 19, 2022, and U.S. Pat. No. 4,739,273, although inspection of the shank portion of tubing, casing, and other OCTG is relatively straightforward, the inspection of the end areas of OCTG is not as simple. These ends are often "upset" (manufactured so that the wall of the OCTG is of extra thickness and strength near the end) and threaded. U.S. Pat. Nos. 4,503,393; 3,710,236; and 4,739,273 are an improvement but still limited in that separate devices must be employed to inspect inner and outer wall surfaces of the end areas. U.S. Pat. No. 5,157,977 discloses an apparatus for eddy current inspection of inner and outer surfaces, and internal and external threads of end areas of tubulars. Unfortunately, eddy current detectors do not detect deep flaws, only surface flaws.

One goal of OCTG producers is high tonnage production per day or other time period, and any process or sub-process that slows down the manufacturing of OCTG or other tubulars is disadvantageous economically. In short, the more tons of pipe out the door the better. It is thus desirable to provide a magnetic tester to locate (axially and radially) tubular flaws at least in the shank portions of tubulars with the ability to accurately discriminate between flaws on the inside and outside circumferences of tubulars at the full speed of the tubular manufacturing facility, or at least in a high-speed, continuous manner compatible with high-speed tubular manufacturing. Any improvement in inspection speed of the shanks of tubulars will compensate for the time required by tubular manufacturers to inspect the end areas. The apparatus, systems, and methods of the present disclosure are directed to these needs.

SUMMARY

In accordance with the present disclosure, apparatus and systems for inspecting OCTG and other tubulars are presented, and methods of using same to inspect OCTG and other tubulars are described which reduce or overcome many of the faults of previously known apparatus, systems, and methods.

A first aspect of the disclosure is a high-speed tubular member EMI system comprising:
- (a) at least one magnetic flux generator (14) contained in a coil annulus (18) and a detector assembly (16) supported by the coil annulus (18);
- (b) the coil annulus (18) and the detector assembly (16) each having inlet and outlet openings (10, 12) for passing a tubular member (2) there through, the detector assembly (16) having one or more magnetic detectors (20), and one or more eddy current detectors (22), the one or more magnetic detectors (20) and the one or more eddy current detectors (22) configured to be spaced a first distance from the tubular member (2) during an inspection;
- (c) the one or more magnetic detectors (20) and the one or more eddy current detectors (22) each contained in one or more EMI detector shoes (30); and
- (d) a conveyor (13) and a drive mechanism (24), the drive mechanism (24) configured to drive the tubular member (2) through the coil annulus (18) at a speed of at least about 150 ft./min (at least about 46 m/min), or at least about 200 ft./min (at least about 61 m/min).

In certain embodiments the one or more magnetic detectors (20) may be selected from the group consisting of hall units, magneto resistors, magneto diodes, and combinations of two or more of these. In certain embodiments the frame (1) may comprise a steel welded sub-frame. In certain embodiments the drive mechanism may comprise one or more pinch roller systems. In certain embodiments the coil annulus (18) may comprise rigid aluminum. In certain embodiments the systems may be configured to perform a quality EMI inspection of OCTG pipe with wall thicknesses up to about 0.625 inch (15.9 millimeters). In certain embodiments the systems may be configured to inspect tubular members (2) of different diameters, the system comprising telescoping sensor supports or an iris mechanism supporting the one or more magnetic detectors and the one or more eddy current detectors. In certain embodiments the systems may be configured to operate continuously and configured to inspect plain-end OCTG materials having an outer diameter ranging from about 2⅜ inches (about 60.3 mm) to about 8.00 inches (about 203.2 mm), or ranging from about 4½ inches (114.3 mm) to about 14.00 inches (355.6 mm). In certain embodiments the systems may be configured to perform EMI inspection methods including magnetic flux leakage technology for OD and ID longitudinal and transverse flaws, magnetic flux density for 100% coverage of the wall thickness variations, and an eddy current system for comparison of metallurgical mass and permeability differences.

In certain embodiments the systems may comprise one or more actuators (40) adapted to pick up the tubular member (2) to be inspected and lay the tubular member onto the conveyor (13). In certain embodiments the one or more actuators (40) may comprise one or more manipulator arms. In certain embodiments the one or more actuators may be selected from the group consisting of pneumatic, hydraulic, and electronic actuators, and combination thereof. In certain embodiments the one or more actuators may be robotic actuators. In certain embodiments the one or more actuators may comprise a crane or gantry. In certain embodiments the one or more actuators may be floor mounted, cabinet-mounted, or roof-mounted. In certain embodiments the one or more actuators may have capacity to lift standard lengths of steel pipe.

In certain embodiments, one or more of the EMI inspection shoes may comprise a flexible, generally arcuate body (as disclosed in assignee's co-pending U.S. patent application Ser. No. 16/987,221, filed Aug. 6, 2020) comprising a flexible material, the flexible, generally arcuate body having a leading end, a trailing end, a non-working major face, and a working major face, the leading end, trailing end, non-working major face, and working major face at least partially defining an inspection zone therebetween, the one or more magnetic flux detectors carried by the flexible, generally arcuate body in the inspection zone. Certain embodiments may comprise one or more pressure actuators removably attached to the non-working face and configured to exert pressure on one or more regions of the non-working major face of the flexible, generally arcuate body in the inspection zone during an EMI of a tubular, forcing the flexible, generally arcuate body to contort into a generally contoured shape as it passes over a contoured region of the tubular.

In certain embodiments the flexible material may have a 300% modulus less than or equal to about 2100 psi (about 14 MPa), or ranging from about 2000 psi (about 14 MPa) to about 1000 psi (about 7 MPa), when tested in accordance with ASTM D412-2015 (Method A); or a 100% modulus less than or equal to about 1000 psi (about 7 MPa), or ranging from about 25 psi (about 0.2 MPa) to about 1000 psi (about 7 MPa), when tested in accordance with ASTM D412-2015 (Method A); or a compression set (CB or $C_B$) less than or equal to about 50, or less than or equal to about 25, less than or equal to about 10, or less than or equal to about 5, or about 1, or about 0, when tested in accordance with ASTM D395-2018 (Method B). In certain embodiments the flexible material may have a 300% modulus less than or equal to about 2100 psi (about 14 MPa), or ranging from about 2000 psi (about 14 MPa) to about 1000 psi (about 7 MPa); and a 100% modulus less than or equal to about 1000 psi (about 7 MPa), or ranging from about 25 psi (about 0.2 MPa) to about 1000 psi (about 7 MPa); and a compression set (CB or $C_B$) less than or equal to about 50, or less than or equal to about 25, less than or equal to about 10, or less than or equal to about 5, or about 1, or about 0. In certain embodiments the flexible material may have an abrasion resistance ranging from about 0 to about 200 mm$^3$, or from about 20 to about 150 mm$^3$, or from about 60 to about 135 mm$^3$, when tested in accordance with ASTM D5963-04(2015).

In certain embodiments the one or more pressure actuators may comprise one or more springs, in certain embodiments having a spring force able to force the flexible material into a concave contour, where the concave contour has a maximum depth of about 0.1 inch (about 2.5 mm), or about 0.2 inch (about 5 mm), or about 0.3 inch (about 7.5 mm), or about 0.4 inch (about 10 mm), or about 0.5 inch (12.5 mm). In certain embodiments the one or more pressure actuators (52) may comprise a differential pressure actuator. In certain embodiments the differential pressure actuator may comprise a closed conduit arranged in a curvilinear structure.

In certain embodiments the EMI inspection shoes may further comprising one or more pressure plates interposed between the one or more pressure actuators and the non-working face of the flexible, generally arcuate body. In certain embodiments the one or more pressure plates may have a flexural strength greater than the flexible material of the flexible, generally arcuate body; in certain embodiments the flexural strength may be about 40 MPa or higher, or from about 40 MPa to about 270 MPa, or from about 70 MPa to about 200 MPa (when tested in accordance with ASTM D-790-2017).

Another aspect of the disclosure is a high-speed tubular member EMI inspection method comprising passing a tubular member through the coil annulus of a system of the present disclosure or driving a coil annulus of a system of the present disclosure past the tubular member and detecting variations in the magnetic field produced by defects in the tubular member. In certain embodiments the variations in the magnetic field may be detected by the magnetic detectors spaced so that their respective magnetic fields abut and provide a minimum of 100 percent inspection of the tubular member.

In certain embodiments the tubular member, OCTG or other tubular, may be hollow; in other embodiments the tubular member may be solid.

In certain embodiments various components (for example, but not limited to the magnetic flux generator, detectors, telescoping supports, and/or iris (as disclosed in assignee's co-pending U.S. patent application Ser. No. 16/987,211, filed Aug. 6, 2020) may be operated remotely via wired or wireless communication, and/or locally via on-board batteries, an on-board motor, and one or more programmable logic controllers (PLCs). Certain embodiments may comprise a software module including one or more algorithms for calculating or presenting parameters selected from the group consisting of longest substantially longitudinal flaw, deepest substantially longitudinal flaw, longest substantially transverse flaw, deepest substantially transverse flaw, minimum and maximum wall thickness, and combinations thereof. In certain embodiments the detector assembly may comprise one or more electromagnetic acoustic transducer (EMAT) sensors.

Certain embodiments may further comprise a tubular conveyor sub-system on which the tubulars traverse before and after being inspected. Certain embodiments may further comprise one or more actuators (in certain embodiments, one or more robots) adapted to pick up the tubular being inspected and insert the tubular into an EMI inspection apparatus as disclosed in accordance with the present disclosure, the one or more actuators selected from the group consisting of pneumatic, hydraulic, and electronic actuators, and combination thereof.

These and other features of the apparatus, systems, and methods of the disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain apparatus, systems, and methods in accordance with the present disclosure may comprise a number of physical or chemical components and features but may be devoid of certain optional physical, chemical or other components and features.

BRIEF DESCRIPTION OF THE DRAWINGS

The manner in which the objectives of this disclosure and other desirable characteristics can be obtained is explained in the following description and attached drawings in which:

It is to be noted, however, that the appended drawings of FIGS. 1-8 may not be to scale and illustrate only typical apparatus and system embodiments of this disclosure. Furthermore, FIG. 9 illustrates only one of many possible methods of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

Figure 1:
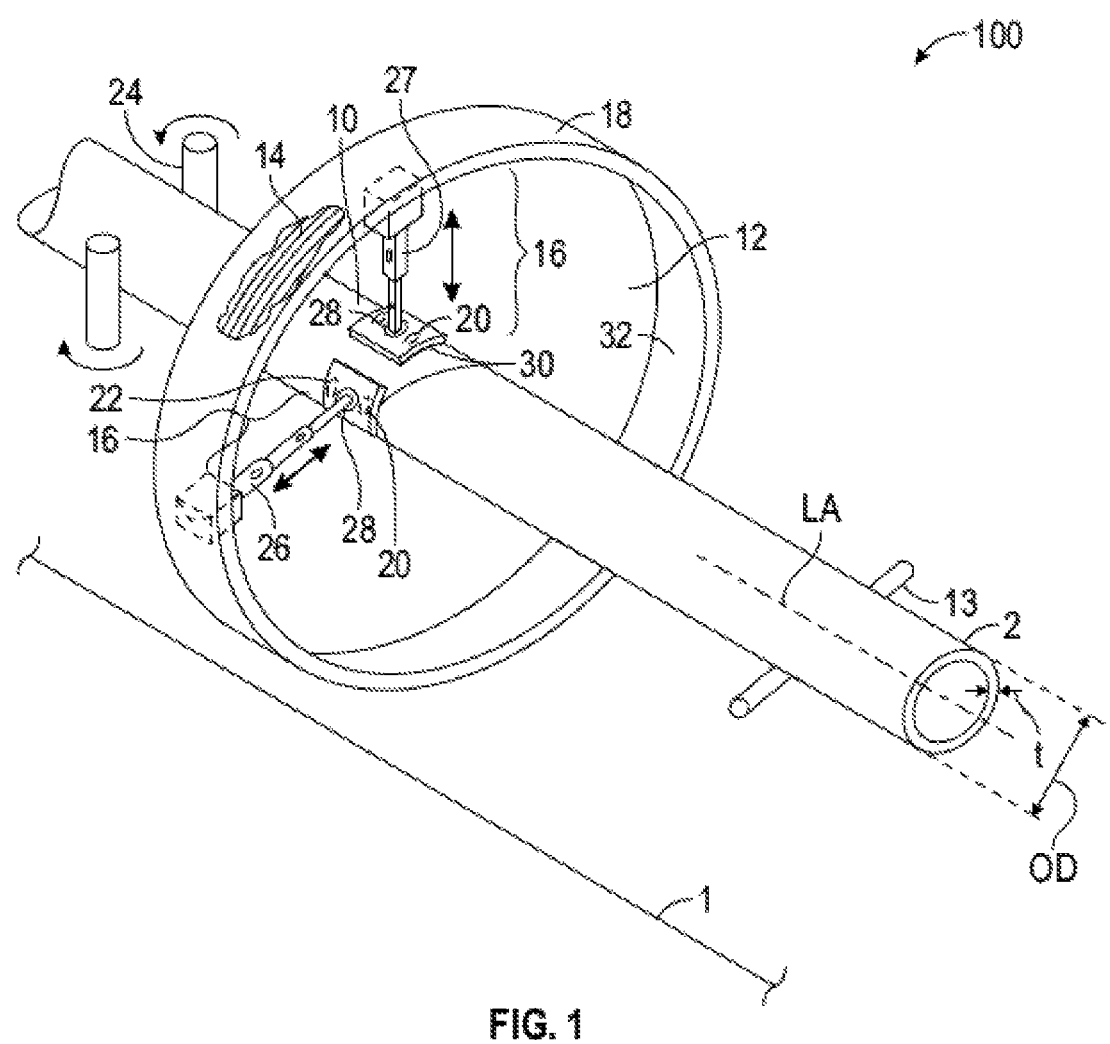
FIG. 1 is a perspective schematic view, with some parts cut away, of a high-speed tubular member EMI inspection system of the present disclosure.

In the following description, numerous details are set forth to provide an understanding of the disclosed apparatus, systems, and methods. However, it will be understood by those skilled in the art that the apparatus, systems, and methods disclosed herein may be practiced without these details and that numerous variations or modifications from the described embodiments may be possible. All U.S. patent applications and U.S. patents referenced herein are hereby explicitly incorporated herein by reference, irrespective of the page, paragraph, or section in which they are referenced. Where a range of values describes a parameter, all sub-ranges, point values and endpoints within that range are explicitly disclosed herein. Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The present disclosure describes apparatus, systems, and methods for inspection of OCTG or other tubular or pipe. As mentioned herein, OCTG means any tubular used in the oil & gas industry, including solid tubulars such as rod pump rods, including but not limited to, drill pipe, line pipe, casing, coiled tubing, and the like, including those that have been through none, all or a combination of any one or more of the common mechanical, thermal, chemical OCTG treatment methods.

Systems of the present disclosure may comprise a single or multiple EMI detectors (sometimes referred to herein as "detector elements", "instruments", or simply "detectors") using magnetic flux leakage principles, eddy current, electromagnetic acoustic (EMA), or any combinations of these, to inspect OCTG for the presence of flaws. The detector(s) may be mounted on the apparatus through a variety of ways depending on the detector being installed, positions available in the apparatus, and the accuracy of flaw detection required. Software either intrinsic to the detector, or installed elsewhere in the apparatus, or installed remotely on a computer type device, converts the measurements into usable calculated information. The usable calculated information may be displayed locally at the device and/or remotely on a computer type device. Digital signal processing software, known under the trade designation Digi-Pro™, available from Scan Systems Corp, Houston, Tex., allows 100 percent of the inspection signal to be digitized and processed within a computer. The computer and digital signal processing software known under the trade designation Digi-Pro™ may utilize a series of virtual printed circuit boards known under the trade designation SimKardz™ to perform the calculations required. Signals may be captured from the detectors and digitized almost immediately, then processed through one or more algorithms to produce large signal to noise ratios. Improvements in signal to noise ratios of at least 20 percent, sometimes at least 100 percent, and in certain embodiments even 200 percent have been seen, compared with existing industry standard equipment. Hall Element devices may be used to sense the electrical shift in voltage during the inspection methods of the invention; however, there could be any number of different sensing technologies that could be used, eddy current being one of the other preferred sensing technologies.

In certain embodiments, the magnetic field fluctuation detectors may be hall units. Other similar devices may be utilized with the method, selected from magneto resistors, magneto diodes, and combinations of hall units, magneto resistors, and magneto diodes. As noted in U.S. Pat. No. 7,038,445, the number of flux lines flowing through the hall detector will be a function of the wall thickness of the material being monitored. Therefore, this monitoring device of the hall units spaced within the inside circumference of a magnetic coil provides the means of measuring the wall thickness of the pipe or OCTG. In certain embodiments, an "or" circuit may be interconnected with each group of magnetic fluctuation detectors so that the largest signal generated from a group of hall units may be determined. In certain embodiments, a defect monitor may be interconnected with each group of the magnetic fluctuation detectors to identify defective hall units.

The term "pipe," as used herein, includes any pipe, hose, tube, pole, shaft, cylinder, duct, rod, oil field tubular, tubing for the flow of oil or gas, casing, drill pipe, oil field tubulars and equivalents thereof made in whole or part of a ferromagnetic material. The term "flaw" as used herein includes any defects, discontinuities or irregularities in the walls or on the surface of the pipe, for example, seams, cracks, chips, and unusual wear.

The term "hall unit," as used herein, includes any Hall detector, and any device or detector which produces a voltage in relation to a magnetic field applied to the detector. Although well known, a brief description of the hall detector is provided. A Hall detector is generally manufactured as a four terminal solid state device which produces an output voltage proportional to the product of an input current, a magnetic flux density and the sine of the angle between magnetic flux density and the plane of the hall detector. A Hall detector typically has an active element and two pairs of ohmic contacts. An electric current flows between two contacts aligned in one direction x. This current, the magnitude and direction of which are known from a calibration stage, in the presence of a perpendicular magnetic field, generates a respective Hall voltage in the other two contacts aligned in a transverse direction y. As known, a Hall detector is sensitive to that component of the magnetic field which is perpendicular to its surface. More specifically, the Hall voltage is responsive to the current flow and to the strength of a magnetic field provided within the vicinity of the Hall detector.

The terms "magnetic field generator" and "magnetic coil" as used herein, include any device capable of generating a horizontal, vertical, or other directional magnetic field of flux. Preferably the magnetic field generator is a coil such an encircling coil or circular coil with multi-turns of wire located in the cavities of the coil. The term "coil annulus" means a structure holding, supporting, and/or encompassing a magnetic field generator or magnetic coil.

Eddy current inspection, as explained in U.S. Pat. No. 5,142,230, is a non-destructive procedure used to detect flaws and stress corrosion in electrically conductive materials. This method involves placing an eddy current probe, comprising a coil, near the electrically conductive material. The coil sets up a magnetic field and induces eddy currents in the material. Defects in the material alter the eddy current flow and change the impedance of the coil. As a result, flaws and stress corrosion may be detected by moving the eddy current probe along the material and detecting changes of impedance of the coil.

In certain embodiments, one or more substantially frictionless members may be employed in the detector shoes (or the structure supporting the inspection shoes) to maintain the first or "standoff" distance, as discussed in U.S. Pat. Nos. 7,397,238 and 7,622,917. In certain embodiments the one or more substantially frictionless members may comprises one or more members selected from precision metal rollers, metal ball bearings, plastic rollers, ceramic balls, and non-rotating spacers in ball or roller shape. In certain embodiments, the inspection shoe supports may be actuated by a dual linkage actuator disclosed in the '238 and '917 patents and selected from pneumatic, hydraulic, and electronic actuators. In certain embodiments, telescoping supports and iris rotatable elements such as disclosed in assignee's co-pending U.S. patent application Ser. No. 16/987,211, filed Aug. 6, 2020, may be actuated by an actuator selected from pneumatic, hydraulic, and electronic actuators. In certain embodiments the detector assemblies may each support a transverse magnetic detector and a wall thickness detector. The detectors may be selected from Hall elements, magneto diodes, and magneto resistors. In certain embodiments, the variations in the magnetic field detected by magnetic flux detectors and the variations in eddy current detected by eddy current detectors are provided by spacing the detectors so that their respective magnetic or electric fields abut and provide a minimum of 100 percent inspection of the tubular member.

In certain embodiments, one or more of the EMI inspection shoes may comprise a flexible, generally arcuate body such as disclosed in assignee's co-pending U.S. patent application Ser. No. 16/987,221, filed Aug. 6, 2020. The flexible, generally arcuate body may have a leading end, a trailing end, a non-working major face, and a working major face, the leading end, trailing end, non-working major face, and working major face at least partially defining an inspection zone therebetween. One or more magnetic flux detectors may be carried by the flexible, generally arcuate body in the inspection zone. One or more pressure actuators may be removably attached to the non-working face and configured to exert pressure on one or more regions of the non-working major face of the flexible, generally arcuate body in the inspection zone during an EMI of a tubular, forcing the flexible, generally arcuate body to contort into a generally contoured shape as it passes over a contoured region of the tubular.

In certain embodiments the flexible material may have a 300% modulus less than or equal to about 2100 psi (about 14 MPa), or ranging from about 2000 psi (about 14 MPa) to about 1000 psi (about 7 MPa), when tested in accordance with ASTM D412-2015 (Method A); or a 100% modulus less than or equal to about 1000 psi (about 7 MPa), or ranging from about 25 psi (about 0.2 MPa) to about 1000 psi (about 7 MPa), when tested in accordance with ASTM D412-2015 (Method A); or a compression set (CB or $C_B$) less than or equal to about 50, or less than or equal to about 25, less than or equal to about 10, or less than or equal to about 5, or about 1, or about 0, when tested in accordance with ASTM D395-2018 (Method B). In certain embodiments the flexible material may have a 300% modulus less than or equal to about 2100 psi (about 14 MPa), or ranging from about 2000 psi (about 14 MPa) to about 1000 psi (about 7 MPa); and a 100% modulus less than or equal to about 1000 psi (about 7 MPa), or ranging from about 25 psi (about 0.2 MPa) to about 1000 psi (about 7 MPa); and a compression set (CB or $C_B$) less than or equal to about 50, or less than or equal to about 25, less than or equal to about 10, or less than or equal to about 5, or about 1, or about 0. In certain embodiments the flexible material may have an abrasion resistance ranging from about 0 to about 200 mm$^3$, or from about 20 to about 150 mm$^3$, or from about 60 to about 135 mm$^3$, when tested in accordance with ASTM D5963-04(2015).

In certain embodiments the one or more pressure actuators may comprise one or more springs, in certain embodiments having a spring force able to force the flexible material into a concave contour, where the concave contour has a maximum depth of about 0.1 inch (about 2.5 mm), or about 0.2 inch (about 5 mm), or about 0.3 inch (about 7.5 mm), or about 0.4 inch (about 10 mm), or about 0.5 inch (12.5 mm). In certain embodiments the one or more pressure actuators (52) may comprise a differential pressure actuator. In certain embodiments the differential pressure actuator may comprise a closed conduit arranged in a curvilinear structure.

In certain embodiments the EMI inspection shoes may further comprising one or more pressure plates interposed between the one or more pressure actuators and the non-working face of the flexible, generally arcuate body. In certain embodiments the one or more pressure plates may have a flexural strength greater than the flexible material of the flexible, generally arcuate body; in certain embodiments the flexural strength may be about 40 MPa or higher, or from about 40 MPa to about 270 MPa, or from about 70 MPa to about 200 MPa (when tested in accordance with ASTM D-790-2017).

The primary features of the apparatus, systems, and methods of the present disclosure will now be described with reference to the drawing figures, after which some of the construction and operational details, some of which are optional, will be further explained. The same reference numerals are used throughout to denote the same items in the figures.

Figure 2:
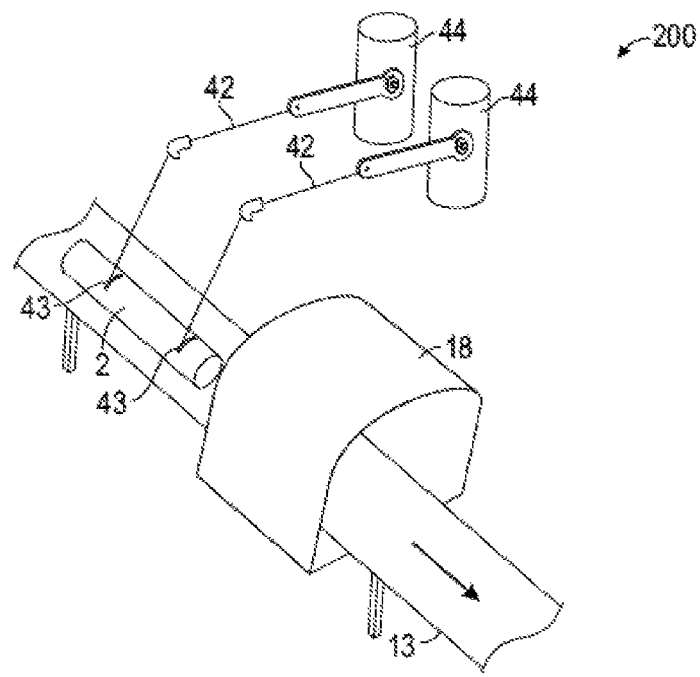
FIGS. 2 and 3 are schematic perspective views of two other high-speed tubular member EMI inspection systems of the present disclosure.
Figure 3:
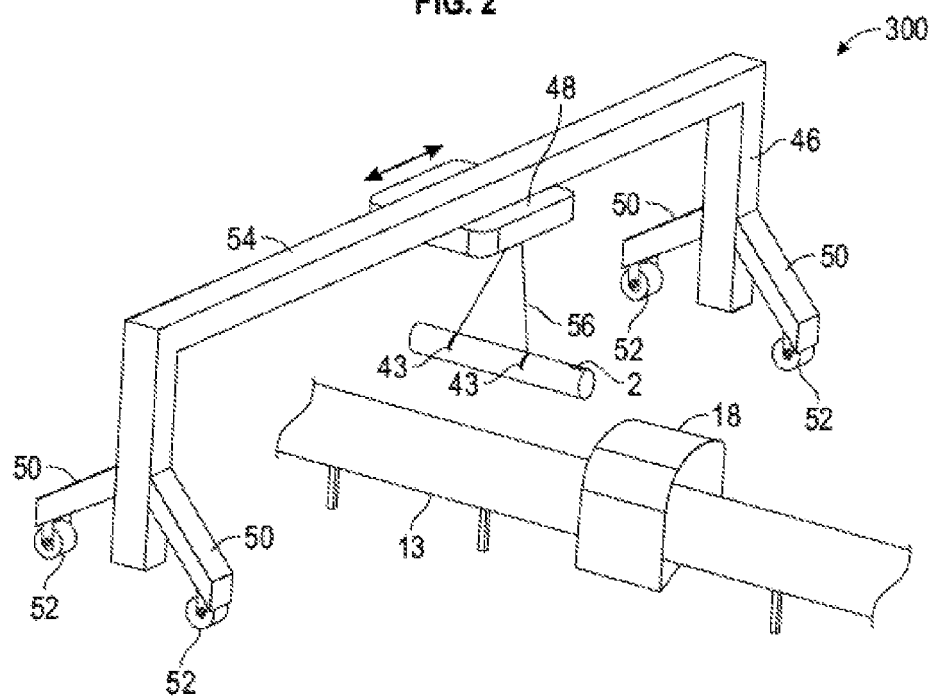

FIGS. 1-3 are schematic perspective illustration views, with some portions cut away, of three high-speed EMI inspection system embodiments 100, 200, and 300 in accordance with the present disclosure. Embodiment 100 may comprise a frame 1, a magnetic flux generator (coil) 14 in a coil annulus 18, and one or more detector assemblies 16 supported by frame 1. Coil annulus 18 and detector assemblies 16 each have an inlet opening 10 and an outlet opening 12 for accepting a tubular member 2 therein for EMI inspection thereof. Detector assemblies 16 each include one or more magnetic flux detectors 20 and one or more eddy current detectors 22 encapsulated in EMI detector shoes 30, the lower surface thereof adapted to be spaced a first distance from the outer surface of tubular member 2. Optionally, detector shoes 30 may be supported by, and spaced the first distance from the outer surface of tubular 2 by supports including one or more substantially frictionless members during an inspection, as taught in assignee's U.S. Pat. No. 7,397,238.

Still referring to FIG. 1, embodiment 100 further comprises detector shoe supports 26, which in this particular embodiment are telescoping supports, each of which is attached to an inner surface 32 of coil annulus 18 such as by welding, brazing, bolting, or other attachment method or mechanism, or formed integrally with coil annulus 18. Detector shoe support 26 has a circular cross-section, while detector shoe support 27 has a rectangular cross-section. The cross-sectional shape may be the same or different for each detector shoe support, and they may have other cross-sectional shapes, such as triangular, oval, and the like. Adjustable telescoping tubes typically include spring button locking pins or single end snap buttons, and may be easily found on the Internet, such as at the website of W.W. Grainger, Inc. Other versions of telescoping supports may lock and unlock by a simple twist action. As indicated by the double-headed arrows in FIG. 1 proximate to telescoping detector shoe supports 26, 27, telescoping detector shoe supports 26, 27 allow detector shoes 30 to be moved inward and outward as desired, conveniently allowing EMI inspection of different OD tubulars 2. In certain embodiments, tubular wall thickness (t) may also be investigated. A further feature of embodiment 100 is provision of quick-acting (Q-A) couplings 28, explained more fully in assignee's co-pending U.S. patent application Ser. No. 16/987,211, filed Aug. 6, 2020, that allow detector shoes 30 to be removably installed and removed quickly. For example, one or more detector shoes 30 for a 4-inch OD pipe may be used to inspect one or more of such tubulars, then the process stopped momentarily, for example by stopping a drive mechanism 24 such as a set of pinch rollers. While the process is stopped, the first set of detector shoes are removed and another set of detector shoes are installed to inspect larger or smaller tubulars. Drive mechanism 24 is capable of moving tubular 2 through the inspection apparatus at speeds up to about 200 ft./min.

In embodiment 100, as in other embodiments described herein, magnetic flux generator 14 is typically a coil of wire having DC or AC current passing therethrough, but this is not strictly necessary, as any magnetic flux generator may be used, such as one or more permanent magnets. A combination of one or more coils and one or more permanent magnets may also be employed, although that may add unneeded complexity. Coil 14 is positioned within coil annulus 18. Coil annulus 18 is defined by a generally cylindrical outer wall of diameter $d_o$ and a concentric generally cylindrical inner wall of diameter $d_i$, wherein $d_o > d_i$. Generally cylindrical outer wall and generally cylindrical inner wall are each generally parallel to a tubular longitudinal axis (LA). Coil annulus 18 is further defined by front and back end plates connecting the generally cylindrical outer wall and the generally cylindrical inner wall at their peripheral edges.

Other system embodiments may include non-telescoping detector shoe supports, which may have a rectangular, circular, or other cross-sectional shape. Certain system embodiments may include provision of quick-acting (Q-A) couplings 22 that allow detector shoes 30 to be removably installed and removed, as well as a second set of Q-A couplings for removably installing and changing to different length non-telescoping detector shoe supports. Yet other system embodiments may have an iris mechanism, explained more fully in assignee's co-pending U.S. patent application Ser. No. 16/987,211, filed Aug. 6, 2020, where the iris comprises a number of leaves with brackets allowing addition of detector shoes 30 to the iris leaves. In certain embodiments, detector shoes 30 may attach directly to the iris leaves, such as by molding them integrally with the leaves, or by interference fittings. The leaves are so shaped that movement of the leaves results in the iris aperture closing, and the detector shoes moving toward the tubular being inspected. The aperture, and thus detector shoes, may be opened, or placed in any desired position, by the positioning of a handle. In alternative embodiment the handle may be connected to an operating actuator, for example an electric motor, which may be electronically controlled. The iris mechanism as described may also be used in a dual plane iris of the known type, which may allow addition detector shoes and/or sensors to be utilized.

Turning now to FIGS. 2 and 3, certain systems and methods in accordance with the present disclosure may further comprises a tubular conveyor sub-system 13, as more fully described in assignee's copending U.S. Pat. No. 11,307,173, issued Apr. 19, 2022 on which a plurality of tubular members P1, P2, P3 . . . PN may traverse before and after being inspected at one of the inspection apparatus of the present disclosure. Such systems, as exemplified schematically by embodiment 200 (FIG. 2) may comprise one or more actuators 44 adapted to pick up a tubular member being inspected (employing manipulators arms 42 and pipe grippers 43) and place tubular members onto the conveyer 13 of an inspection system, the one or more actuators selected from the group consisting of pneumatic, hydraulic, and electronic actuators, and combination thereof. In certain embodiments, such as embodiment 200, actuator or actuators 44 may be robotic actuators, such as the IRB 7600 industrial robot, available from ABB Asea Brown Boveri Ltd. Certain embodiments, such as exemplified by embodiment 300 (FIG. 3), may comprise a gantry crane or other pipe lifting equipment known in the OCTG inspection industry, such as a jib crane, or bridge cranes. Gantry cranes may include height adjustable or non-height adjustable gantry 46 having a hoist 48 movable in the direction of the arrow on a crossbeam 54. Hoist 48 may have one or more lifting chains or belts 56, and gantry 46 may have one or more support brackets 50, optionally with wheels 52. Actuators may be floor mounted, cabinet-mounted, or roof-mounted. In certain embodiments the actuator(s) should have capacity to lift standard lengths of steel pipe. Conveyors, gantry cranes, jib cranes, and bridge cranes are commercially available, for example from L.K. Goodwin Co., West Greenwich, R.I. (USA).

As noted herein, certain system embodiments may include one or more quick-acting couplings selected from the group consisting of ball-lock couplings, roller-lock couplings, pin-lock couplings, flat-faced couplings, bayonet couplings, ring-lock couplings, cam-lock couplings, multi-tube connectors, and combinations thereof. These features are further described in assignee's co-pending U.S. patent application Ser. No. 16/987,211, filed Aug. 6, 2020. The choice of a particular material for the Q-A couplings is dictated among other parameters by the vibration and degree of expected twisting motion of the inspection shoes expected during use of EMI inspection apparatus, temperature, an expected humidity and other environmental conditions.

Flexible materials suitable for use in the EMI inspection shoes of the present disclosure are many, but a few examples are provided here. The flexible materials described in U.S. Pat. No. 4,465,829 comprise the addition of selected amounts of particular low molecular weight polyisobutylene to natural rubber containing compositions, which reduces heat build-up normally incident to dynamic conditions. In other words, such addition reduces hysteresis, i.e. reduces the amount of energy dissipated as heat when the rubber is subjected to a stress strain cycle. The compositions allow the inclusion of preferred amounts of reinforcing filler and the use of normal cross-linking conditions without deleterious effect on tear strength, and also reduces compression set in the cured compositions, without unduly affecting modulus, tensile and elongation properties. The compositions are elastomeric compositions for use under dynamic, high heat (e.g. up to 300° F.) conditions and comprise (a) 100 parts by weight of elastomer selected from the group consisting of natural rubber and blends of natural rubber with up to about 50% by weight synthetic rubber, (b) from 5 to about 15 parts by weight of polyisobutylene having a number average molecular weight ranging from about 800 to about 2,000, and (c) from about 30 to about 75 parts by weight of reinforcing filler. The aforementioned ingredients are utilized in combination with a curing system to provide a cured composition with the aforementioned very desirable attributes. The aforementioned ingredients (a), (b), and (c) are normally kept apart from at least part of the curing system until just prior to curing. The number average molecular weights referred to herein are those determined by vapor pressure osmometry. As used in the '829 patent, the term "phr" means parts by weight per 100 parts by weight of elastomer. Tests conducted on these materials (according to the patent) revealed the flexible materials have a compression set of 20.8, and 300% modulus between 1870 psi and 2010 psi (12.5 to 13.4 MPa).

The flexible materials described in U.S. Pat. No. 4,585,826 comprise inclusion of selected amounts of particular liquid carboxy-terminated unsaturated butadiene-acrylonitrile copolymers (sometimes referred to hereinafter as CTBN) to natural rubbers. The compositions have increased the tear strength compare with natural rubber containing compositions. The compositions allow the inclusion of preferred amounts of reinforcing filler and the use of normal cross-linking conditions without deleterious effect on tear strength and instead is characterized by increased tear strength compared to a natural rubber composition without the CTBN additive, and allows the flexibility of including synthetic rubber in place of some of the natural rubber while maintaining the high tear strength normally associated with natural rubber compositions. The inclusion of the selected amounts of the CTBN increases the hardness of cured compositions and reduces the viscosity (thus aiding processing) of uncured compositions. The compositions are elastomeric compositions which are curable and comprise (a) 100 parts by weight polymer consisting of (i) from about 95 to about 25 parts by weight of natural rubber, (ii) from 0 to about 65 parts by weight of synthetic rubber, (iii) from about 5 to about 25 parts by weight of liquid carboxy-terminated butadiene-acrylonitrile copolymer having a functionality ranging from about 1.5 to about 2.5, an acrylonitrile content ranging from about 10% to about 40% by weight and a Brookfield viscosity at 27° C. ranging from about 50,000 to about 200,000 centipoise, and (b) from about 30 to about 120 parts by weight of reinforcing filler. The aforementioned ingredients are used with a conventional curing system to provide a cured composition which exhibits the aforementioned very desirable attributes. In certain embodiments, the aforementioned ingredients (a) and (b) can be kept apart from at least part of the curing system until just prior to curing. As used in the '826 patent, the term "phr" refers to parts by weight per hundred parts by weight of polymer consisting of natural rubber, any synthetic rubber present and the CTBN. Tests conducted on these materials (according to the patent) revealed the flexible materials have a compression set of 33, and 300% modulus of 1889 psi (12.6 MPa).

The flexible materials described in the '826 and '829 patents may be enhanced by the addition of nanometric filamentary structures, such carbon nanotubes and other such additives, as defined and described in U.S. Pat. No. 9,879,131. Tests conducted on these materials (according to the patent) revealed the flexible materials have a 100% modulus ranging from 679 to 892 psi, a 300% modulus ranging from 1142 to 2634 psi (MPa), and an abrasion resistance (ASTM D-5963-04(2015) ranging from 62 to 133.

Figure 4:
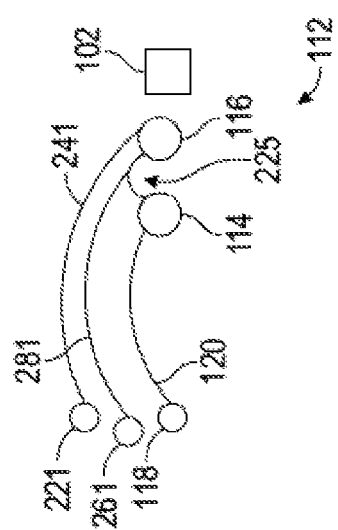
FIG. 4 is a schematic view of one embodiment of a first detector and second detector elements of apparatus of this disclosure.

Suitable pressure actuators for use in the apparatus, systems, and methods of the present disclosure include industrial springs of many types, including coil springs, washer springs (or spring washers, or belleville spring washers), and differential pressure actuators. In certain embodiments the pressure actuators may have be able to exert a force sufficient to force the flexible material into a concave contour, where the concave contour has a maximum depth of about 0.1 inch (about 2.5 mm), or about 0.2 inch (about 5 mm), or about 0.3 inch (about 7.5 mm), or about 0.4 inch (about 10 mm), or about 0.5 inch (12.5 mm). The force sufficient to force the flexible material into a concave contour may be several pounds (Newtons) of force, up to about 20 pounds of force (about 90 N), or from about 2 (about 9 N) to about 15 (about 68 N), or from about 3 (about 14 N) to about 10 pounds (about 45 N) of force, depending on the physical properties of the flexible material. In the case of belleville springs, one or more belleville springs, or their many variations, of the same or different spring force may be used in any given pressure actuator, including stacked belleville springs (series stacks, parallel stacks, and series-parallel stacks). Belleville springs, and variations of classic belleville springs including slotted disc springs, contact disc springs, finger spring washers, wave spring washers, and the like, are commercially available from MW Industries, Inc., Rosemont, Ill., (USA). Belleville washers or belleville springs are available in many materials, including steel, plastic, and elastomeric materials. Selection may be made using the Precision Spring Catalog (2014), published and available online from the same company. The spring or belleville spring(s) may be enclosed in a cylinder as illustrated in FIGS. 2-4, or other structure.

In certain embodiments the differential pressure actuator may comprise a closed conduit arranged in a curvilinear structure, such as disclosed in U.S. Pat. No. 9,097,081. By applying a differential pressure to the closed conduit, the curvature of the curvilinear structure is changed. This change can be used to actuate a corresponding tool between desired operational positions. As the pressure inside the closed conduit increases relative to the pressure acting on the exterior of the closed conduit, the curves of the closed conduit tend to straighten. This tendency to straighten is useful for applying an actuation force. For example, the closed conduit can be used to drive a movable member coupled to a tool which is actuated between operational positions. By way of example, the closed conduit may be constructed from a metal material, such as a steel material. In some environments, the closed conduit may be constructed from stainless steel to limit corrosion. However, the closed conduit may be made from a variety of other metals and other types of materials depending on the parameters of a given environment and application.

The skilled artisan, having knowledge of the particular application, environmental conditions, and available materials, will be able design the most cost effective, safe, and operable EMI inspection shoes and systems for each particular application without undue experimentation.

One aspect of this disclosure is high-speed magnetic inspection systems for ferromagnetic tubulars that utilize a first magnetic field to induce a first signal in a first detector, and a high frequency signal to induce a second signal in a second detector. The first detector may be a known magnetic detection device, such as that described in U.S. Pat. No. 7,038,445 to Walters, et al. ("the '445 patent"), the description of which is incorporated herein by reference. The function of the first detector is to provide an indication of the existence of a flaw in the tubular, and the nature of the flaw, such as whether the flaw is longitudinal or transverse. However, the first detector does not identify whether the flaw is on the inner or outer circumference of the tubular. Although the detector described in the '445 patent utilizes Hall effect sensors, those of skill in the art will recognize that, without departing from the scope of this disclosure, such a detector may utilize any of a variety of sensors that are sensitive to changing magnetic field strengths, such as magneto diodes.

Devices described herein also utilize a second, high frequency detector sensitive to changes in magnetic flux.

Because the second detector radiates a high-frequency signal, the signal it induces in the ferromagnetic wall of the tubular will be constrained by skin effect to the region very near the outer circumference of the tubular. Accordingly, any flaws detected by the second detector will be in the outer circumference of the tubular.

In certain embodiments, both the first and second detectors provide a signal output to a discriminator. The discriminator determines whether the flaw has been detected by both detectors, and is therefore in the outer circumference of the tubular, or only by the first detector, which means that the flaw is on the inner circumference. In this manner, both the nature and location of flaws can be accurately determined at the full speed of the production line.

One aspect of the present disclosure is directed toward solving or alleviating problems in inspection of tubular members, in particular pipe, tubing, sucker rods, and the like used in the petroleum production and petrochemical industries. Referring to FIG. 4, a schematic view of a first detector 102 and second detector element 112 of the present disclosure are illustrated schematically. First detector 102 may be a Hall effect detector, but may also, as a matter of engineering choice, be any of a variety of detectors (for example, magneto diodes) sensitive to changes in magnetic fields, and which output a signal related to the magnetic field detected by the sensor.

Second detector element 112 comprises a first antenna 114 and a second antenna 116. In certain embodiments, first antenna 114 and second antenna 116 are coil antennas, but these antennas may be comprised of any antennas sensitive to magnetic field changes. If coil antennas are utilized, the number of windings and choice of wire size is a matter of engineering choice, although it is understood that higher frequency signals will work better with coils of fewer windings, and that smaller coils allow closer proximity between first antenna 114 and second antenna 116. Those of skill in the art will recognize that, when second detector element 112 is in close proximity to a ferromagnetic tubular (see, for example, FIG. 7 and the description thereof, below) the relative size of first antenna 114 and second antenna 116 will affect the overall size of second detector element 112, and thus affect the size of the portion of the tubular being tested. Moreover, those of skill in the art will recognize that it is desirable to maintain close proximity between first detector 102 and second detector element 112 so that effective comparison of signals from the two detectors is possible.

Additionally, those of skill in the art will recognize that skin effect is sensitive to frequency in that the higher the frequency of a signal, the smaller the depth to which it penetrates a conductor that carries it. Methods and apparatus of this disclosure may utilize a frequency of approximately 60, 70, 80 or up to 100 kHz, although other frequencies may also be used and use of a particular frequency is primarily a matter of engineering choice. Higher frequencies allow detection of flaws closer to the outer circumference of a tubular.

Figure 5:
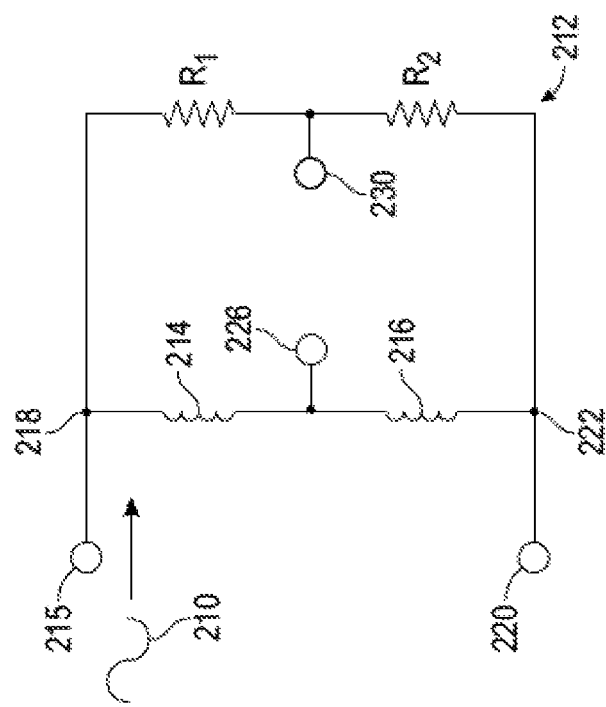
FIG. 5 is a schematic view of an embodiment of a second detector of this disclosure, comprising a bridge circuit.

Referring to FIGS. 4 and 5, second detector 212 comprises second detector element 112, illustrated schematically in FIG. 4. First antenna 114 is in signal communication with first connect point 118 via first lead 120. Similarly, second antenna 116 is in signal communication with second connect point 221 via second lead 241. Finally, bridge point 225 is in signal communication with bridge connector 261 via third lead 281. It will be understood that all signal communications described herein may be of any practical form, such as electrical, optical, or radio frequency, in any form that is practical or in any combination that is practical, without departing from the scope of the disclosure. Second detector 212 comprises a bridge circuit with signal input points 215 and 220, which are driven by a high frequency input signal, such as harmonic input 210. Second detector element 112 illustrated schematically in FIG. 4 is part of the bridge circuit of second detector 212, with connect point 218 corresponding to first connector point 118, connect point 222 corresponding to second connector 221, first antenna 214 corresponding to first antenna 114, second antenna 216 corresponding to second antenna 116 and first bridge output 226 corresponding to bridge connector 261.

Resistors R1 and R2 may be sized as a matter of engineering choice, but those of skill in the art will recognize that it is desirable that they are matched resistors, and first antenna 114 and second antenna 116 similarly are of matched impedance. When so configured, and when utilized as described herein, second detector 212 will maintain a zero voltage output between first bridge output 226 and second bridge output 230 if in proximity to an unflawed section of tubular. Further, because the bridge circuit of second detector 212 is driven by a high frequency signal, skin effect will cause a non-zero voltage output between first bridge output 226 and second bridge output 230 only if a flaw is detected in the outer circumference of the tubular. When proximate to such a flaw, the flaw will cause an alteration in magnetic flux that will be responded to differently by first antenna 114 and second antenna 116 due to their physical separation.

Figure 6:
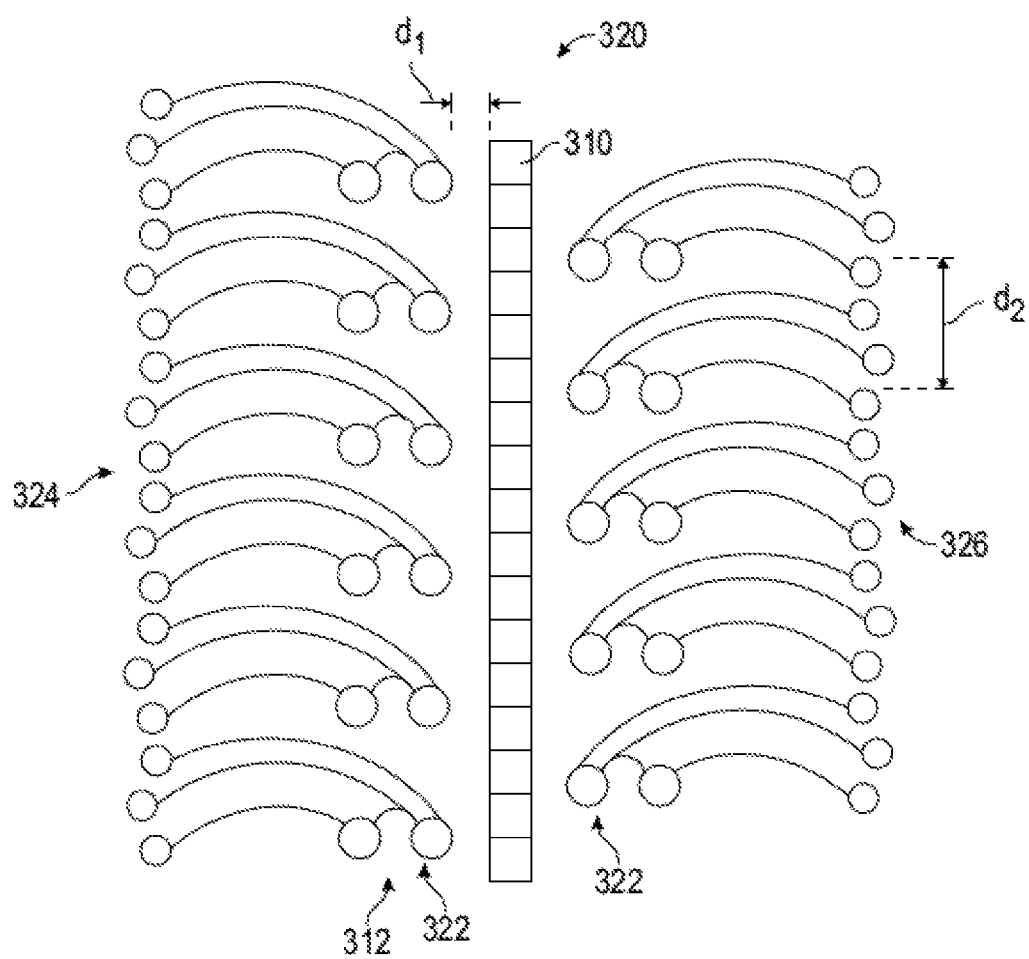
FIG. 6 is a schematic view of one embodiment of an array of first detectors and second detector elements of this disclosure.

Referring now to FIG. 6, a schematic view of a preferred embodiment of the first and second detectors of FIGS. 4 and 5 is illustrated schematically. This embodiment utilizes a first array 320 of first detectors 310, such as Hall effect detectors. There is additionally a second array 322 of second detector elements 312, divided into a first array group 324 and a second array group 326. The bridge circuit portions of the second detectors (see FIG. 5, 212) are omitted for clarity. However, those of skill in the art will recognize that each of the second detector elements 312 will be in signal communication with such a bridge circuit, and that each of these bridge circuits as well as each of first detectors 310 will be in signal communication with a signal processor, such as a computer (not illustrated schematically).

Further, it is understood that the design of bridge circuit 212 is not a limitation on the implementation of apparatus and methods of this disclosure, as a variety of engineering solutions (for example, op-amp comparator circuitry) can be applied to process the output signals from first antenna 114 and second antenna 116 of FIG. 4.

Such arrays of detectors are desirable because they allow the simultaneous coverage of a reasonable area of tubular without sacrificing the precision necessary to localize a particular flaw. However, it would be possible to use the single-unit first and second detector arrangement of FIGS. 4 and 5, although efficiency might be sacrificed. Alternatively, many other physical arrangements of detector arrays are possible, and are a matter of engineering choice that does not depart from the scope of apparatus and methods claimed.

Referring again to FIG. 6, those of skill in the art will further recognize that it is desirable to adjust spacings d1 and d2 to insure that anomalies (flaws) detected by a first detector are also detected by a second detector when the flaw is on the outer circumference of the tubular. As an example of such adjustment, first array group 324 and second array group 326 are depicted with staggered spacing relative to each other.

Figure 7:
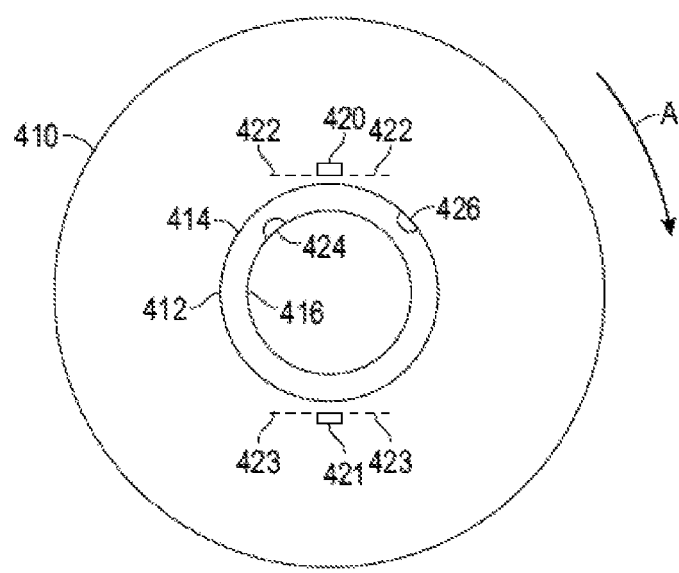
FIG. 7 is a schematic cross section of a detector arrangement of one embodiment of apparatus of this disclosure.

Referring now to FIG. 7, a schematic representation of one embodiment of the present disclosure is illustrated schematically. A tubular 412 comprises an outer circumference 414 and an inner circumference 416. In operation, tubular 412 would be transiting longitudinally through the plane of the drawing at approximately 200 feet per minute, or 3.3 feet per second. The detection apparatus comprises a magnet, such as a DC electromagnet 410, first and second arrays of first detectors 420, 421, and first and second arrays of second detector elements 422,423. To insure coverage of the entire tubular, the entire detection apparatus is rotated at high angular velocity about the tubular 412 in the direction of arrow A. In operation, first and second arrays of first detectors 420, 421 will respond to the presence of both inner flaw 424 on the inner circumference 416 of tubular 412 and to outer flaw 426 on the outer circumference of tubular 412. Conversely, first and second arrays of second detector elements 422, 423 will be responsive only to outer flaw 426, due to skin effect resulting from the high frequency driving signal of the second detectors.

Those of skill in the art will recognize that a wide variety of detector arrangements is possible, for example, three sets at 120 degree separation, four sets at 90 degree separation, and the like. The necessity for rotating the apparatus about the tubular at high speed implies a balanced arrangement, but accurate counterweighting could relieve such a necessity. Accordingly, such arrangements become a matter of engineering and economic choice.

Figure 8:
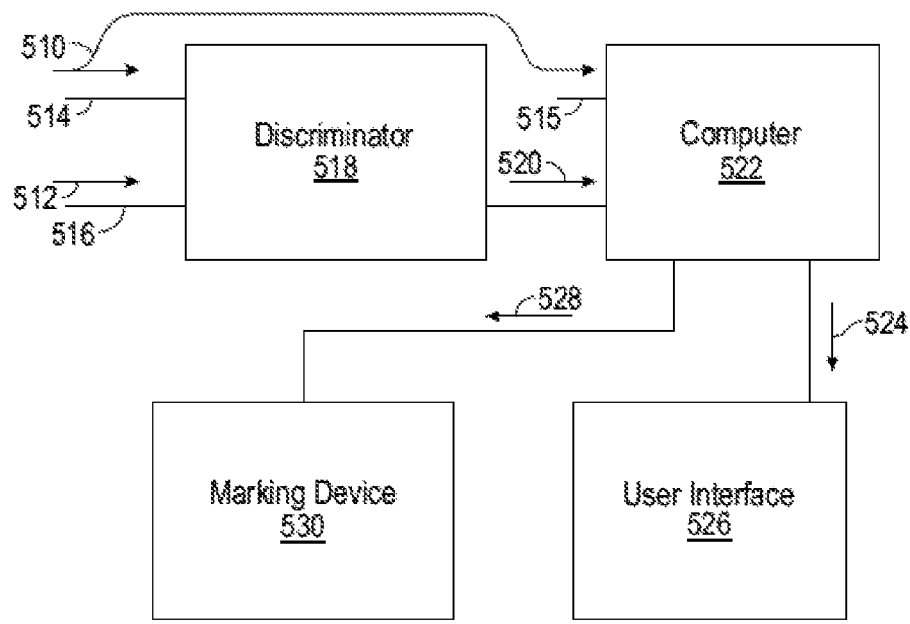
FIG. 8 is a block diagram illustrating data flow through a system utilizing apparatus and methods of this disclosure.

Referring to FIG. 8, an example of data flow through a data system in one embodiment of the disclosure is illustrated schematically as a block diagram. First data stream 510 from, for example, an array of first detectors such as 320 of FIG. 6, is provided to a discriminator 518 via first discriminator input 514. Those of skill in the art will recognize that first discriminator input 514 may provide multi-channel access to data from multiple first detectors by a variety of signal couplings, for example, by multi-channel direct inputs or by multiplexing. Similarly, second data stream 512 from a second detector (FIG. 5, 212) or array thereof is provided to discriminator 518 at second input 516. As with first input 514, second input 516 may be a multi-channel input, and may or may not be multiplexed. Given sufficient processor speed and the use of buffering, first and second inputs 514, 516 could be multiplexed through a single input without departing from the scope of the disclosure. Discriminator 518 may be a separate unit or an integral part of a computer, such as 522. Thus a signal processor of the present disclosure may comprise a single computer, such as 522, or a combination of devices such as discriminator 518 and computer 522. Those of skill in the art will recognize that, without departing from the scope of the disclosure, a variety of signal processing methodologies may be adopted. For example, the signals from the first and second detectors (or arrays thereof) may be filtered electronically, or digitized and evaluated by software, or a combination of these techniques.

When a flaw is detected in a tubular (FIG. 7, 412), discriminator 518 determines whether the flaw is a flaw on the inner circumference (signal from only the first detector) or on the outer circumference (signal from both first and second detectors). Discriminator 518 provides this information to a computer 522 via third data stream 520. Computer 522 also receives the information from first data stream 510 via computer input 515, because first data stream 510 also contains information regarding the nature of the flaw.

Computer 522 can then process the information received from first and third data streams 510, 520 under software control to determine in real time the nature of the flaw and whether it is on the inner or outer circumference of the tubular. This information may be provided to a user via fourth data stream 524 to a user interface 526, such as a monitor or printer, or a combination thereof. Additionally, computer 522 may control, either directly or indirectly, a marking device 530 via fifth data stream 528, so that the tubular may be marked with indications showing the presence of the flaw and its location.

Figure 9:
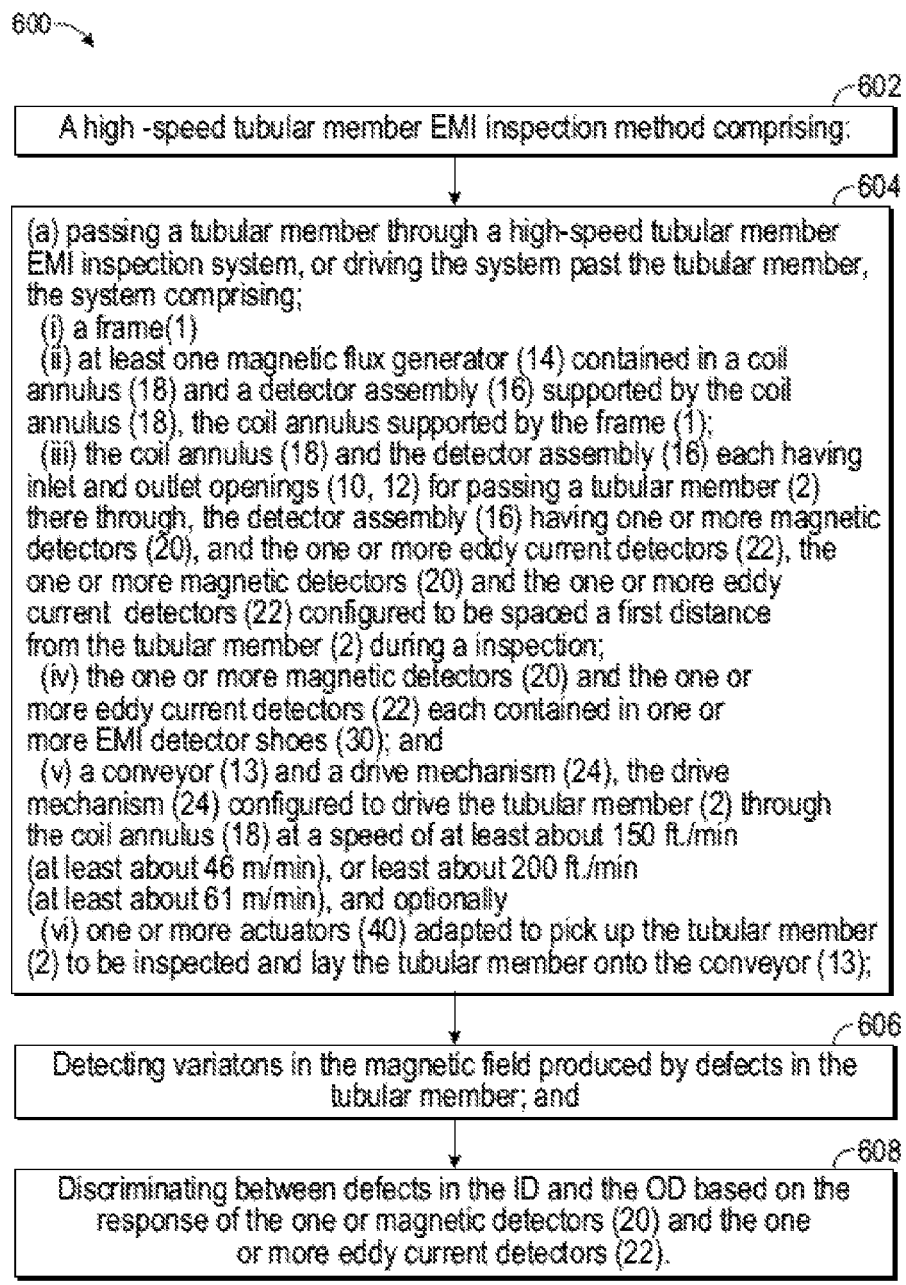
FIG. 9 is a logic diagram of one method of inspecting pipe or other OCTG in accordance with the present disclosure.

FIG. 9 is a logic diagram of one method embodiment 600 of high-speed EMI inspecting pipe or other OCTG in accordance with the present disclosure. Method embodiment 600 comprises (box 602) passing a tubular member through a high-speed tubular member EMI inspection system, or driving the system past the tubular member, the system comprising a frame (1); at least one magnetic flux generator (14) contained in a coil annulus (18) and a detector assembly (16) supported by the coil annulus (18), the coil annulus supported by the frame (1); the coil annulus (18) and the detector assembly (16) each having inlet and outlet openings (10, 12) for passing a tubular member (2) there through, the detector assembly (16) having one or more magnetic detectors (20), and one or more eddy current detectors (22), the one or more magnetic detectors (20) and the one or more eddy current detectors (22) configured to be spaced a first distance from the tubular member (2) during an inspection; the one or more magnetic detectors (20) and the one or more eddy current detectors (22) each contained in one or more EMI detector shoes (30); and a conveyor (13) and a drive mechanism (24), the drive mechanism (24) configured to drive the tubular member (2) through the coil annulus (18) at a speed of at least about 150 ft./min (at least about 46 m/min), or at least about 200 ft./min (at least about 61 m/min), and optionally (vi) one or more actuators (40) adapted to pick up the tubular member (2) to be inspected and lay the tubular member onto the conveyor (13) (box 602). Method embodiment 600 further comprises detecting variations in the magnetic field produced by defects in the tubular member (box 604), and discriminating between defects in the ID and the OD based on the response of the one or more magnetic detectors (20) and the one or more eddy current detectors (22) (box 606).

An on-board power unit may be included in certain system embodiments for powering the magnetic flux generator(s), which may be a permanent or rechargeable battery pack or transformer for electrical power, or both. An on-board electronics package may include one or more microprocessors, a communications link (wired or wireless), and/or an on-board controller. A CRT, LED or other human-machine interface may be included on or in a workstation cabinet in certain embodiments.

Magnetic flux generator(s), detector shoes, crane hoists, and drive mechanisms such as pinch rollers may, in certain embodiments, be powered from within via an instrument display or other human/machine interface (HMI), for example using batteries, Li-ion or other type. In other embodiments display/HMI may be powered from an instrument cable providing power, perhaps by a local generator, or grid power. The display/HMI allows an operator to interface with the instrument. In certain embodiments the operator will be able to take measurements, view or read these measurements and reset the instrument for subsequent measurement taking. If the display/HMI is connected to a power cable, then measurements may be taken remotely, stored and reset as necessary.

In certain embodiments power would be supplied at a voltage and current that enables the systems to be intrinsically safe. By "intrinsically safe" is meant the definition of intrinsic safety used in the relevant IEC apparatus standard IEC 60079-11, defined as a type of protection based on the restriction of electrical energy within apparatus and of interconnecting wiring exposed to the potentially explosive atmosphere to a length below that which can cause ignition by either sparking or heating effects. For more discussion, see "AN9003—A User's Guide to Intrinsic Safety", retrieved from the Internet Jul. 12, 2017, and incorporated herein by reference.

What has not been recognized or realized are high-speed systems and methods to inspect OCTG, especially with a combination of magnetic flux detectors and eddy current detectors. Systems and methods to accomplish this quickly to increase pipe production without significant risk to workers is highly desirable.

In will be apparent that in other embodiments, the various components need not have the shapes illustrated in the various drawing figures, but rather could take any shape. For example, the coil annulus could have a box or cube shape, elliptical, triangular, pyramidal (for example, three or four sided), prism-shaped, hemispherical or semi-hemispherical-shaped (dome-shaped), or combination thereof and the like, as long as the apparatus is capable of generating the required magnetic flux to inspect the OCTG or other tubulars. Cranes could be roof-mounted or wall-mounted. It will be understood that such embodiments are part of this disclosure and deemed with in the claims. Furthermore, one or more of the various components may be ornamented with various ornamentation produced in various ways (for example stamping or engraving, or raised features such as reflectors, reflective tape, and the like), oil tool designs, logos, letters, words, nicknames (for example BIG JAKE, and the like). Hand holds may be machined or formed to have easy-to-grasp features for fingers, or may have rubber grips shaped and adorned with ornamental features, such as raised knobby gripper patterns.

From the foregoing detailed description of specific embodiments, it should be apparent that patentable apparatus, systems, and methods have been described. Although specific embodiments of the disclosure have been described herein in some detail, this has been done solely for the purposes of describing various features and aspects of the apparatus, systems, and methods, and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification of system embodiments would be to provide rotation of the inspection unit rather than, or along with, rotation of the OCTG or other tubular. Such embodiments are considered with the present disclosure.

What is claimed is:

1. A high-speed tubular member electromagnetic inspection (EMI) system comprising:
   (a) at least one magnetic flux generator (14) contained in a coil annulus (18) and a detector assembly (16) supported by the coil annulus (18);
   (b) the coil annulus (18) and the detector assembly (16) each having inlet and outlet openings (10, 12) for passing a tubular member (2) there through, the detector assembly (16) having one or more magnetic detectors (20), and one or more eddy current detectors (22), the one or more magnetic detectors (20) and the one or more eddy current detectors (22) configured to be spaced a first distance from the tubular member (2) during an inspection, the system configured to inspect tubular members (2) of different diameters, the system comprising an iris mechanism supporting the one or more magnetic detectors (20) and the one or more eddy current detectors (22);
   (c) the one or more magnetic detectors (20) and the one or more eddy current detectors (22) each contained in one or more EMI detector shoes (30); and
   (d) a conveyor (13) and a drive mechanism (24), the drive mechanism (24) configured to drive the tubular member (2) through the coil annulus (18) at a speed of at least about 150 ft./min (at least about 46 m/min), or at least about 200 ft./min (at least about 61 m/min).

2. The high-speed tubular member EMI system of claim 1 wherein the one or more magnetic detectors (20) are selected from the group consisting of hall units, magneto resistors, magneto diodes, and combinations of two or more of these.

3. The high-speed tubular member EMI system of claim 1 wherein the drive mechanism (24) comprises one or more pinch roller systems.

4. The high-speed tubular member EMI system of claim 1 wherein the coil annulus (18) comprises rigid aluminum.

5. The high-speed tubular member EMI system of claim 1 configured to perform a quality EMI of oil country tubular goods (OCTG) pipe with wall thicknesses up to about 0.625 inch (15.9 millimeters).

6. The high-speed tubular member EMI system of claim 1 configured to operate continuously and configured to inspect plain-end oil country tubular goods (OCTG) materials having an outer diameter ranging from about 2⅜ inches (about 60.3 mm) to about 8.00 inches (about 203.2 mm), or ranging from about 4½ inches (114.3 mm) to about 14.00 inches (355.6 mm).

7. The high-speed tubular member EMI system of claim 1 configured to perform EMI methods including magnetic flux leakage technology for OD and ID longitudinal and transverse flaws, magnetic flux density for 100% coverage of the wall thickness variations, and an eddy current system for comparison of metallurgical mass and permeability differences.

8. A high-speed tubular member electromagnetic inspection (EMI) inspection system comprising:
   (a) at least one magnetic flux generator (14) contained in a coil annulus (18) and a detector assembly (16) supported by the coil annulus (18);
   (b) the coil annulus (18) and the detector assembly (16) each having inlet and outlet openings (10, 12) for passing a tubular member (2) there through, the detector assembly (16) having one or more magnetic detectors (20), and one or more eddy current detectors (22), the one or more magnetic detectors (20) and the one or more eddy current detectors (22) configured to be spaced a first distance from the tubular member (2) during an inspection, the system configured to inspect tubular members (2) of different diameters, the system comprising an iris mechanism supporting the one or more magnetic detectors (20) and the one or more eddy current detectors (22);
   (c) the one or more magnetic detectors (20) and the one or more eddy current detectors (22) each contained in one or more EMI detector shoes (30);
   (d) a conveyor (13) and a drive mechanism (24), the drive mechanism (24) configured to drive the tubular member (2) through the coil annulus (18) at a speed of at least 150 ft./min (at least about 46 m/min), or at least about 200 ft./min (at least about 61 m/min); and (e) one or more actuators (40) adapted to pick up the tubular member (2) to be inspected and lay the tubular member onto the conveyor (13).

9. The high-speed tubular member EMI system of claim 8 wherein the one or more actuators (40) comprises one or more manipulator arms.

10. The high-speed tubular member EMI system of claim 8 wherein the one or more actuators (40) are selected from the group consisting of pneumatic, hydraulic, and electronic actuators, and combination thereof.

11. The high-speed tubular member EMI system of claim 8 wherein the one or more actuators (40) are robotic actuators.

12. The high-speed tubular member EMI system of claim 8 wherein the one or more actuators (40) comprises a crane or gantry.

13. The high-speed tubular member EMI system of claim 8 wherein the one or more actuators (40) is floor mounted, cabinet-mounted, or roof-mounted.

14. The high-speed tubular member EMI system of claim 8 wherein the one or more actuators (40) have capacity to lift standard lengths of steel pipe.

15. A high-speed tubular member electromagnetic inspection (EMI) method comprising:
   (a) passing a tubular member through the coil annulus (18) and the detector assembly (16) of claim 8 or driving the coil annulus (18) and the detector assembly (16) of claim 8 past the tubular member;
   (b) detecting variations in the magnetic field produced by defects in the tubular member; and
   (c) discriminating between defects in the ID and the OD based on the response of the one or more magnetic detectors (20) and the one or more eddy current detectors (22).

16. The method of claim 15 wherein the variations in the magnetic field are detected by the magnetic detectors spaced so that their respective magnetic fields abut and provide a minimum of 100 percent inspection of the tubular member.

17. The method of claim 15 wherein the EMI occurs at a speed of at least about 150 ft./min (at least about 46 m/min).

18. The method of claim 15 wherein the EMI occurs at a speed of at least about 200 ft./min (at least about 61 m/min).

* * * * *